Nov. 8, 1955  E. V. BERGSTROM ET AL  2,723,224
METHOD AND APPARATUS FOR CONDUCTING MOVING CONTACT
MATERIAL HYDROCARBON CONVERSION PROCESSES
Filed June 10, 1952  4 Sheets-Sheet 3
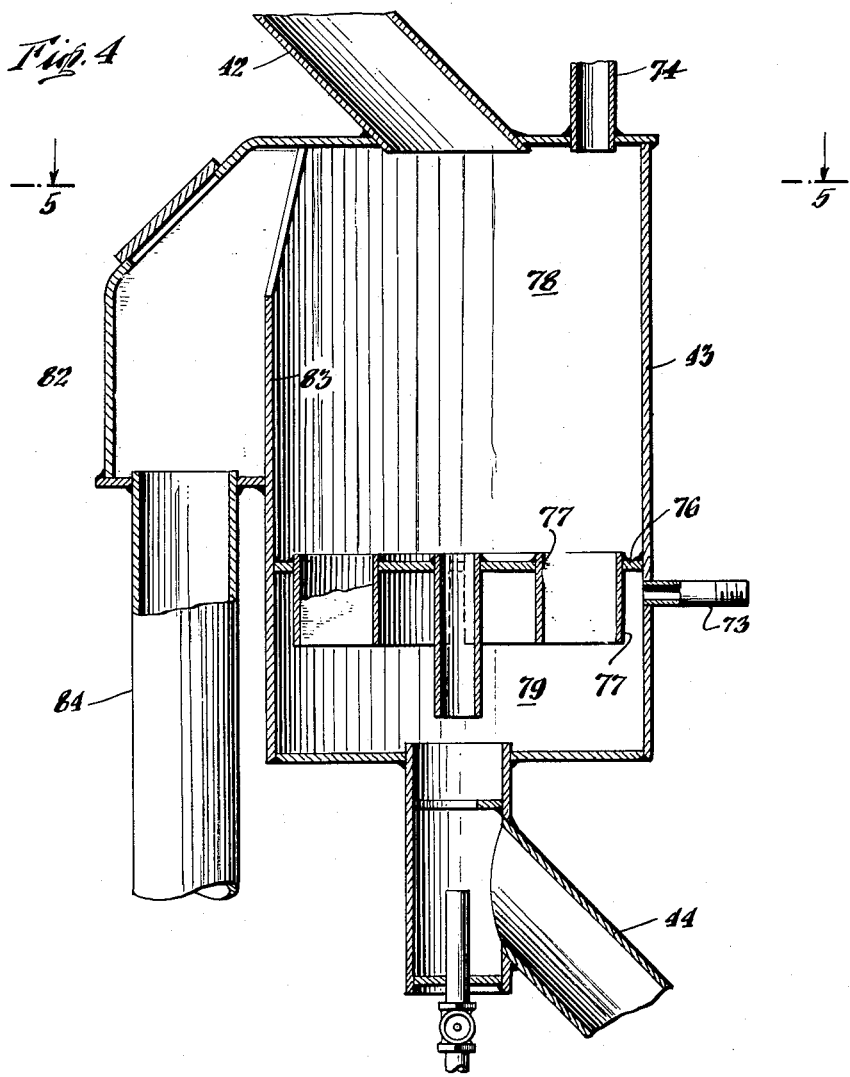
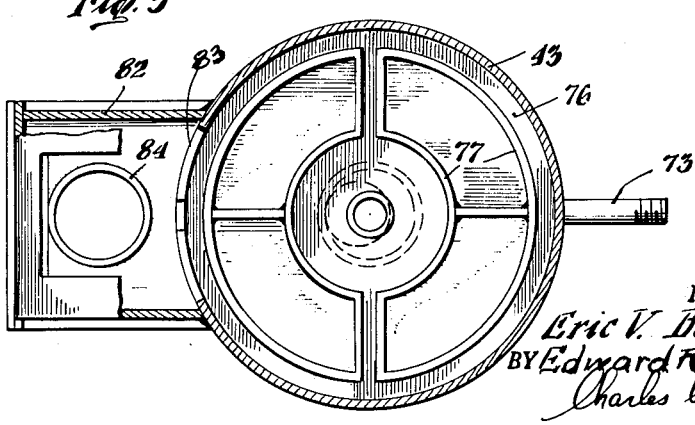
INVENTORS
Eric V. Bergstrom
Edward R. Saef
Charles G. Huggett
BY
ATTORNEY Nov. 8, 1955    E. V. BERGSTROM ET AL    2,723,224
METHOD AND APPARATUS FOR CONDUCTING MOVING CONTACT
MATERIAL HYDROCARBON CONVERSION PROCESSES
Filed June 10, 1952                    4 Sheets-Sheet 4

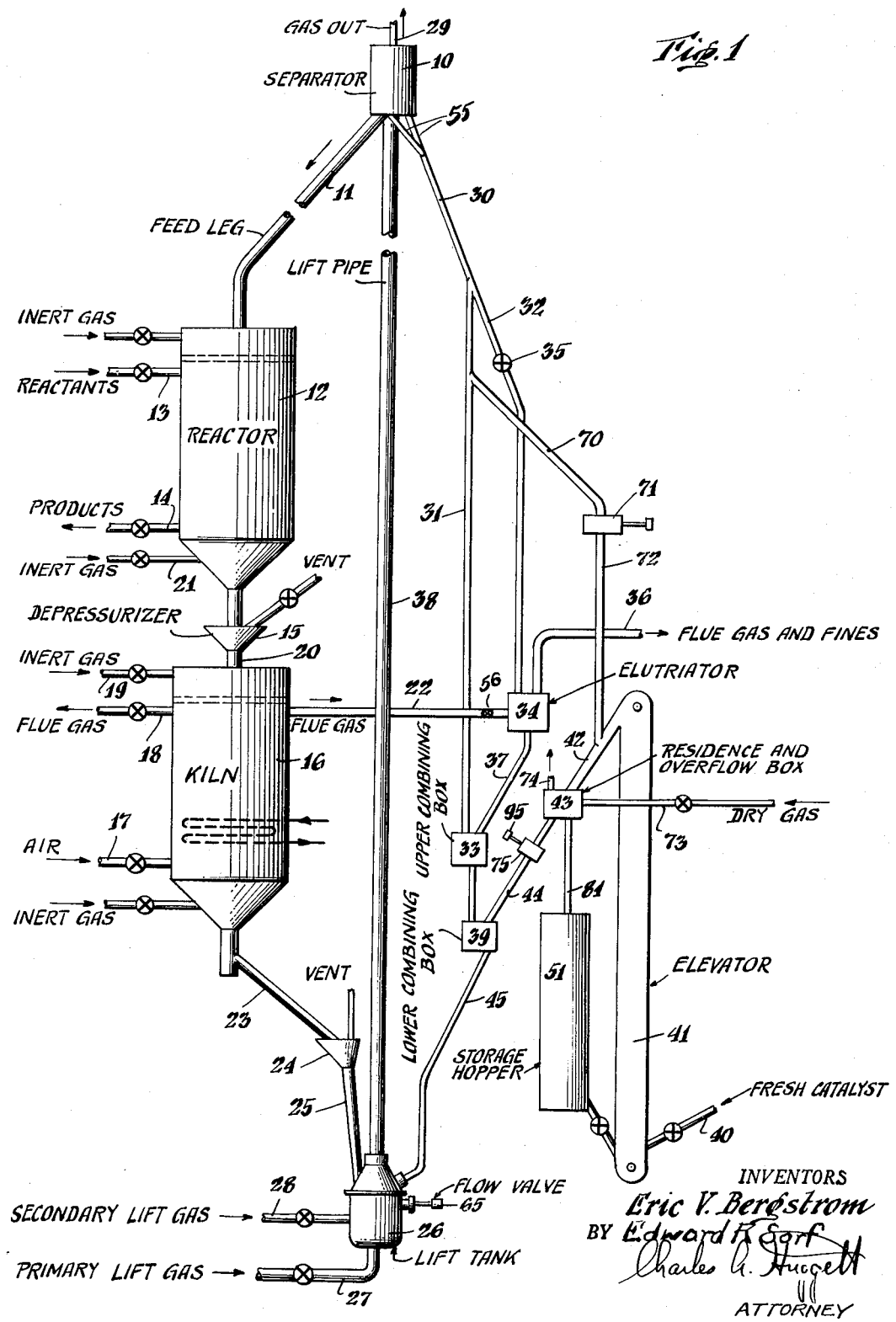

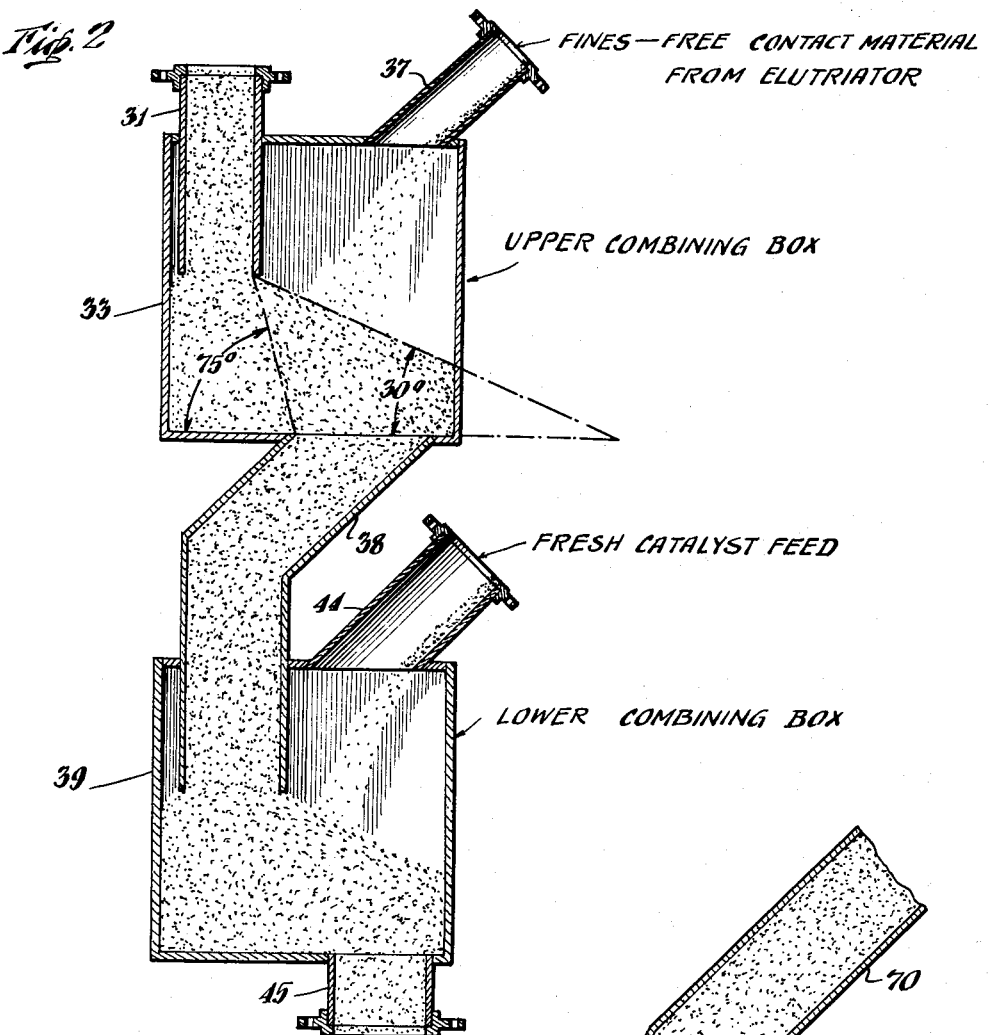
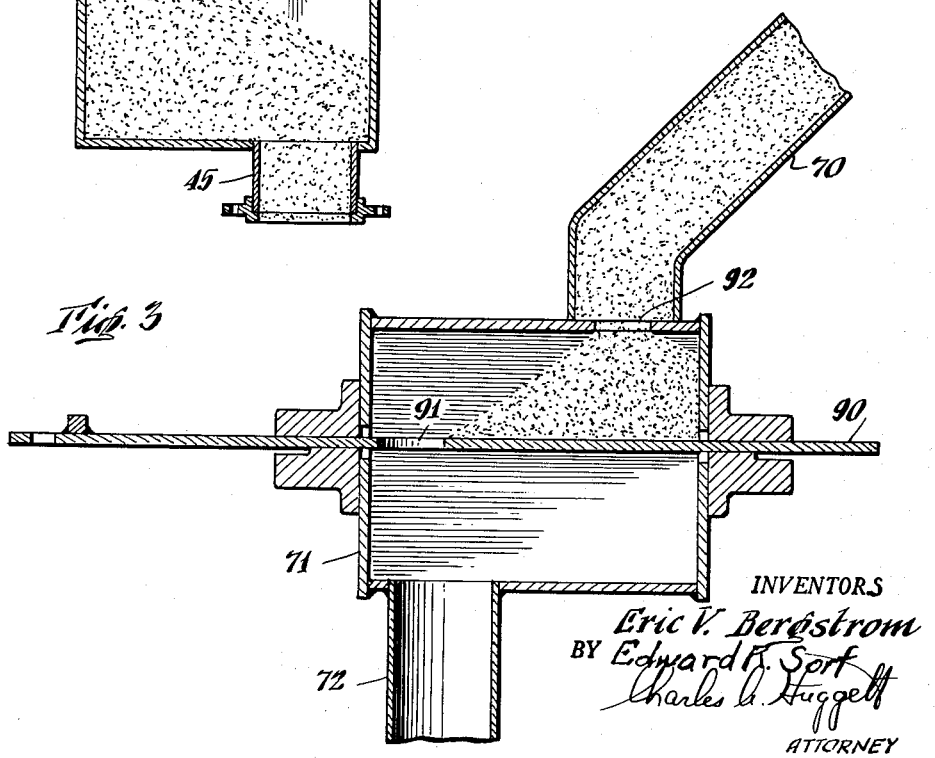

EFFECT OF SUPERFICIAL AIR VELOCITY UPON DRYING EFFICIENCY

EFFECT OF CATALYST RESIDENCE TIME UPON DRYING EFFICIENCY

INVENTORS
*Eric V. Bergstrom*
BY *Edward T. Gorf*
*Charles W. Huggett*
ATTORNEY

United States Patent Office 2,723,224
Patented Nov. 8, 1955

2,723,224

METHOD AND APPARATUS FOR CONDUCTING MOVING CONTACT MATERIAL HYDROCARBON CONVERSION PROCESSES

Eric V. Bergstrom, Short Hills, and Edward R. Sorf, New Brunswick, N. J., assignors to Socony Mobil Oil Company, Inc., a corporation of New York Application June 10, 1952, Serial No. 292,654

3 Claims. (Cl. 196—52)

This invention pertains to processes for the conversion of fluid hydrocarbons in the presence of a granular contact material which may or may not be catalytic in nature. Typical processes to which this invention pertains are the catalytic cracking conversion, isomerization, hydrogenation, reforming, dehydrogenation, aromatization, hydroforming, treating and desulfurization of petroleum fractions. Also typical are the coking, viscosity reducing of petroleum residuums and high temperature pyrolytic conversion processes such as the conversion of propane and ethane to ethylene or of methane to acetylene. In these latter processes the granular contact material serves merely as a heat carrying material.

An important commercial unit for continuously conducting reactions of this type is one wherein the granular contact material is passed cyclically through hydrocarbon conversion and contact material reconditioning zones in which it flows downwardly as a substantially compact column. The contact material employed in such a process may be a catalyst in the form of natural and treated clays, bauxites, inert carriers impregnated with certain catalyst active metallic oxides or synthetic associations of silica, alumina, magnesia or of combinations thereof to which may be added small additional amounts of metallic oxides for specific purposes. When the contact material is employed for heat carrying purposes only, it may take the form of metal balls, capsules containing fusible alloys, pebbles, Carborundum, mullite, zirconium oxide, fused alumina and the like. For coking processes the solid material may consist of a low activity clay catalyst, petroleum coke or porous inert material such as pumice. The contact material may be in the form of pellets, spheres, tablets or irregular shaped particles and it should be understood that the term "granular" is employed broadly herein as covering any of the above. The contact material particles may range in size from about 3–100 mesh Tyler Screen Analysis, and preferably should be of the order of 4–15 mesh Tyler.

For purposes of illustration, the invention will be described with reference to a specific process, a catalytic cracking process. In the moving bed system of catalytic cracking, the particles in granular form are contacted with suitably prepared hydrocarbons while gravitating downwardly through a reaction zone in the form of a substantially compact column. The feed stock, usually a gas oil boiling somewhat above the gasoline boiling range, cracks in the presence of the catalyst, forming substantial amounts of hydrocarbons which do boil in the gasoline boiling range. Incident to the cracking operation, a deposit of carbonaceous material or coke is deposited on the surface of the catalyst, impairing its ability to function catalytically. The coked or spent catalyst is removed from the bottom of the reaction zone continuously and transferred to the top of a gravitating compact column of particles in a regeneration zone. The catalyst gravitating through the regeneration zone is contacted with a combustion supporting gas, such as air, to burn off the coke deposits from the surface of the catalyst. The coke-free or regenerated catalyst is withdrawn continuously from the bottom of the column in the regeneration zone and transferred to the top of the reaction zone, completing the continuous path. This process involves the use of high temperatures and may involve the use of high pressures. For example, the reaction zone may be maintained at about 800–1100° F., suitable cracking temperature, and the regeneration zone may be maintained at about 1000–1300° F., suitable regeneration temperature. The catalyst is lifted, therefore, at temperatures of approximately 800–1200° F., or thereabouts, from beneath one of the zones to the top of the other zone to complete an enclosed cyclic path.

As the catalyst material gravitates through the contacting zones, the gas or vapors contact the catalyst surface by passing through the voids between the particles. It is desirable to maintain the flow of gas through the bed uniform for a variety of reasons. For example, channelling of gas through the reactor may result in non-uniform coke deposition on the catalyst and non-uniform conversion of the hydrocarbon charge. The cracking efficiency is materially reduced from that which is obtained when the gas flows uniformly through the bed. Channelling in the regenerator causes the particles passing through the channel to overheat and thereby damage the catalytic activity of these particles. Those particles not receiving their share of combustion supporting gas are not sufficiently regenerated to regain their former cracking activity.

Channelling is caused in these moving bed systems by the classification or accumulation of fine particles. Fine particles or fines are continuously produced in these systems by attrition. Attrition involves the breaking or spalling of the catalyst particles when they impinge upon each other or the metal walls of the enclosed system. Attrition is also caused by the particles sliding against each other or against the metal walls. The fines tend to classify or gather together, especially when the catalyst is passed through sloping chutes. In addition to causing the gas to channel through the beds, the fines cause an increased pressure drop across the beds. For these and other reasons, it is necessary to remove fines from the system and replenish the inventory with fresh catalyst.

Recently, moving bed conversion systems have been developed which incorporate gas lifts to raise the contact material from the bottom of one gravitating column to the top of the other column. When a side by side arrangement of regenerator and reactor is used, two gas lifts are required. When a superimposed arrangement is utilized, such as reactor over regenerator or vice versa, only one gas lift need be used. A preferred form of lift comprises essentially a substantially vertical lift pipe, a lift tank located at the bottom of the pipe and a separator located at the top of the pipe, the ends of the pipe being projected to an intermediate location in each vessel. The catalyst is introduced into the feed tank to form a substantially compact mass about the bottom of the lift pipe. The major portion of the lift gas is introduced through a primary gas conduit located a short distance below the pipe and directed up the pipe. A relatively smaller amount of secondary gas is introduced into the lift tank to enter the bed of catalyst a spaced distance away from the lower end of the lift pipe. The primary gas passes up the pipe without passing through any substantial thickness of catalyst bed whereas the secondary gas passes through at least a portion of the bed to push catalyst into the primary gas stream. The particles, both granular and fines, are suspended by the gas and lifted up the pipe to the separator. The particles settle from the gas in the separator onto a bed of the solid material about the top of the lift pipe, and the gas is withdrawn separately from the vessel.

The lift tank is generally operated at a pressure above atmospheric and the separator at or even below atmospheric. At least there must be a pressure drop across the lift pipe to effect transfer of the contact material therethrough. A suitable lift tank is disclosed in more detail in copending application for Letters Patent Serial Number 211,258, filed February 16, 1951, now U. S. Patent No. 2,695,815. A suitable lift pipe is disclosed and claimed in copending application Serial Number 210,942, filed February 14, 1951, and a suitable separator is disclosed and claimed in copending application Serial Number 211,238, filed February 16, 1951.

In the preferred form of moving bed system a side stream of contact material is withdrawn from the bottom of the separator, split into two streams, one of which is passed through an elutriator for fines removal, and then the streams are recombined in a combining box and reintroduced into the lift tank. The combining box is so designed that the catalyst discharged from the bottom of the box is preferentially taken from the elutriator, with only a slight flow being maintained through the other stream to prevent stoppage. These features of the moving bed conversion system are shown and claimed in copending application for Letters Patent Serial Number 228,293 filed May 25, 1951, now U. S. Patent No. 2,656,306.

Inasmuch as some catalyst attrition is always present in these systems and therefore catalyst is always being removed in the form of fines, fresh catalyst must be added from time to time to replenish the catalyst inventory. It has been proposed to add catalyst make-up directly into the lift pot through an elongated seal leg or a pressure lock system. Also, it has been proposed to add the catalyst make-up to a combining box located in the elutriator drag stream. It has been found, however, that when cold catalyst having a substantial moisture content is contacted with hot catalyst, so that the cold moist catalyst is suddenly brought up to operating temperature, excessive attrition occurs. It has also been discovered that a source of high catalyst attrition occurs when cold catalyst having a substantial percentage of moisture is introduced into a gas lift or conveyed upwardly by a high temperature lift gas.

The object of this invention is to provide an improved apparatus and method for introducing fresh make-up catalyst into an operating moving bed hydrocarbon conversion system.

A further object of this invention is to provide an improved apparatus and method of introducing fresh catalyst into an operating hydrocarbon conversion system with minimum catalyst attrition.

A further object of this invention is to provide an improved apparatus and method for removing moisture from make-up catalyst while it is being added to a continuous moving bed hydrocarbon conversion system in such a way that the catalyst is added with minimum attrition or breakage.

These and other objects of the invention will be made more apparent in the following detailed description of the invention, in which reference is made to the attached figures.

Figure 1 is a vertical elevation of a moving bed cracking system incorporating the instant invention.

Figure 2 is a vertical elevation in section showing the details of the upper and lower combining boxes of Figure 1.

Figure 3 is a vertical elevation in section of the flow control valve of Figure 1.

Figure 4 is a vertical elevation in section of the residence and overflow box of Figure 1.

Figure 5 is a plan view in horizontal section of the residence and overflow box as shown on plane 5—5 of Figure 4.

Figure 6:
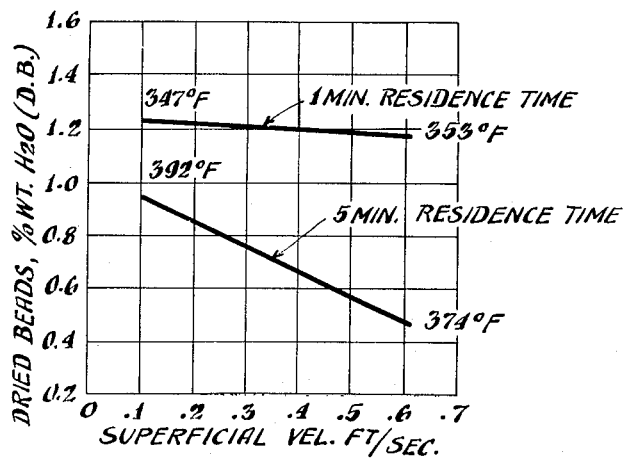
Figure 6 is a graph showing the effect of superficial air velocity upon drying efficiency.

Referring now to Figure 1, the main stream of catalyst is withdrawn continuously from the bottom of the separator 10 through the conduit 11. The catalyst gravitates downwardly as a substantially compact column into the top of the reaction vessel 12, which may be maintained at an advanced pressure of about 5–30 p. s. i. (gauge) and a temperature of about 800–1100° F. An inert gas is introduced into the top of the vessel 12 or the bottom of the feed leg 11 to prevent the transfer of reactant gas through the pipe 11. The catalyst gravitates through the reactor as a substantially compact bed and is contacted therein with reactant hydrocarbons, suitably prepared for reaction, introduced through the conduit 13. The reactants may be in liquid, vapor or mixed liquid and vapor form, preheated, generally, to about 700–800° F., although higher or lower temperature may, in certain instances, be used, depending to some extent, upon the type of charging stock. The hydrocarbons are converted, upon contacting the catalyst, to more desirable materials and the products are removed from the vessel through the conduit 14 to fractionation and processing apparatus, not shown. Inert gas is introduced into the bottom of the vessel through the conduit 21 to prevent the downward movement of reaction gases. The spent catalyst is withdrawn continuously from the bottom of the vessel and introduced into the depressurizer 15, usually where the pressure is reduced practically to atmospheric. This is done, primarily, because it is simpler and more economical to regenerate or restore the material at substantially atmospheric pressure. In some cases, however, the contact material is regenerated at advanced pressure. This pressure may be greater than that in the reactor, and in such a case, it may be found more expedient to place the kiln over the reactor.

The depressurized catalyst is gravitated downwardly as a compact column through the reconditioner or kiln 16 wherein it is contacted with combustion supporting gas and the coke, deposited on the surface of the particles during reaction, is burned. The kiln is maintained at a temperature of about 1000–1300° F. Temperatures higher than that may heat damage the catalyst, impairing its catalytic activity. Where only a heat carrying medium is required, however, inert refractory particles such as corhart, or mullite, may be used and restored at temperatures well in excess of the above without damage. In order to control the temperature of the kiln, cooling coils may be utilized. Air is introduced into the kiln through the conduit 17 and flue gas is removed from the kiln through the conduit 18. A stream of flue gas is taken from the kiln through the conduit 22 to supply the elutriator, disclosed in more detail hereinafter.

The catalyst is withdrawn from the bottom of the kiln 16 through the conduit 23 to a depressurizer 24. The catalyst is then gravitated downwardly as a substantially compact column through the conduit 25 into the top of the lift tank 26. A suitable inert lift gas, such as flue gas, air or steam, which may be supplied through the conduits 27, 28, is introduced into the lift tank and passes upwardly through the lift pipe 38, effecting suspension and lifting of the catalyst. The catalyst settles onto a bed of solids in the separator 10 and the gas is discharged through the conduit 29. The lift tank is usually operated at an advanced pressure and the separator is generally operated at atmospheric pressure, or in some instances, slightly less.

At least one side stream of catalyst is withdrawn from the bottom of the vessel 10 through conduits 55. Preferably a multiplicity of withdrawal conduits is used attached at locations equally distributed about the bottom of the vessel. These downwardly directed conduits are combined into a single conduit 30. Conduits 31, 32 are attached to the lower end of conduit 30, to split the catalyst stream into two separate streams. The first stream is gravitated downwardly as a substantially compact column from the separator to an upper combining box, located at the bottom of the conduit 31. The second stream is in substantially compact form down to a release valve 35 in the conduit 32. The flow of this stream is controlled by the valve 35 so as to form a shower of descending particles below the valve. Of course, the two streams can be carried in separate conduits from the separator, if desired, instead of the arrangement shown.

An elutriator is attached to the bottom of the conduit 32. The particles pass downwardly through the vessel. Gas introduced through the conduit 22 passes upwardly through the particles. The gas flow is controlled by means of the valve 56, to effect suspension of the fine particles in the gas stream, without interfering with the downward movement of the granules. The fines-free contact material is removed from the vessel through the conduit 37 to the upper combining box. The fines pass out the top of the vessel entrained in the gas.

Referring now to Figure 2, the conduit 31 terminates within the upper combining box 33. The conduit 37 also terminates in the top of the upper combining box. A withdrawal conduit 38 is attached to the bottom of the box. The withdrawal aperture of the conduit 38 in the bottom of the box 33 is located substantially directly below the discharge aperture of the conduit 37 carrying the second stream. The dispersed particles, after contacting the surface of the bed, roll down the inclined surface to a location above the withdrawal aperture. The discharge aperture of the conduit 31 carrying the first stream is laterally displaced from the withdrawal aperture, so that an imaginary line connecting the closest point of the discharge aperture with that of the withdrawal aperture is located at or about the internal angle of catalyst flow. The angle of internal flow varies from about 65 to 80 degrees depending upon the nature of the catalyst. When catalyst is withdrawn from an outlet located beneath a bed of the material, the withdrawal occurs from a generally cone-shaped region located directly above the withdrawal aperture. The slope of the side element of the cone varies from 65–80 degrees broadly depending upon the catalyst. In most cases it has been found that preferably the angle with the horizontal of a line through the nearest points on adjacent edges of outlet 38 and inlet 31 should be about 70–75 degrees with the horizontal, as indicated on Figure 2. By locating at least most of the discharge aperture of conduit 31 outside this region, the catalyst introduced through the conduit 37 is preferentially withdrawn from the box to that introduced through the conduit 31. The level of the discharge aperture of the conduit 31 is located above the withdrawal aperture so that the catalyst introduced through the conduit 31 forms a bed which covers the withdrawal aperture. The catalyst forms a free surface at the angle of repose of the material. This ranges from about 25–45 degrees, broadly, and is usually about 30 degrees. When sufficient catalyst is introduced through the conduit 37 to maintain the surface level of the bed of catalyst in the combining box 33 up to the outlet of the conduit 31, the catalyst flow through the conduit 31 is restricted or stopped. When sufficient catalyst is not introduced through the conduit 37 to maintain the level constant, the bed surface pulls away from the outlet aperture of the conduit 31, allowing catalyst to tumble out of the conduit and roll down the surface of the bed at a rate which is fast enough to prevent the bed level from falling any substantial distance.

It is preferred that under all conditions at least some catalyst be withdrawn from the first stream to maintain a continuous catalyst movement. Otherwise, the particles tend to pack and bridge the conduit. Also, the particles in the leg when stationary cool to a low temperature. When the flow is resumed, the cool catalyst tends to upset the thermal conditions in the system. In order to insure continuous movement in the first stream, the first stream is laterally displaced from the withdrawal stream so that an imaginary line connecting the nearest point of the withdrawal stream with the nearest point of the first stream forms an angle with the horizontal which is greater than the internal angle of catalyst flow. It is preferred that the angle be only slightly greater than the angle of internal flow, so that when the flow of the second stream is high, the flow of the first stream is reduced to a minimum necessary to overcome the defects of a static stream. For example, if the internal angle is about 70 degrees, 75 degrees would be satisfactory in most cases.

The conduit 38, depending from the upper combining box, conducts the withdrawal stream downwardly into a lower combining box 39. The catalyst is discharged onto a bed of catalyst in this box, similar to the discharge of the first stream onto the bed surface in the upper combining box. Since the fines are continuously removed, the catalyst inventory is depleted to the extent that, from time to time, fresh catalyst must be added. A level indicator is usually incorporated in the separator 10 to determine the need for fresh catalyst. The fresh supply is added through the conduit 40 into a rising bucket-type elevator 41 and is discharged therefrom into the conduit 42, overflow box 43 and conduit 44 into the lower combining box 39. The particles are withdrawn from the box 39 through the conduit 45 as a substantially compact stream and introduced into the top of the lift tank 26. The gas pressure in the elutriator is usually slightly higher than atmospheric, say, for example, 0.5 p. s. i. (gauge) in order to provide suitable gas flow through the vessel. The upper combining box is maintained at substantially the same pressure. The fresh catalyst is introduced at atmospheric pressure. The column of catalyst between the two boxes is made long enough to provide a suitable seal between the vessels and prevent any substantial transfer of gas from one zone to another. The lift tank 26 is usually operated at advanced pressure, say, for example, 3 p. s. i. (gauge). Hence, the seal column in conduit 45 must be made long enough to prevent the escape of any substantial amount of the gas in the lift tank and also provide smooth feeding of the catalyst downwardly into the lift tank against the advanced pressure. The catalyst is discharged into the lift tank 26 from a location above the bed of catalyst therein. The flow of the catalyst through the conduit 45 is controlled by a valve 65 at the bottom of the conduit.

It has been found that if the fresh catalyst has picked up too much moisture from the atmosphere, the catalyst breakage of the new catalyst will be very high. Catalyst when first produced usually contains about 0.8–1.0 per cent moisture by weight. However, if the catalyst is allowed to stand before being used, as usually occurs, the moisture content may rise to about 3–5 per cent. It has been found that fresh catalyst undergoes considerable breakage when heated in a gas stream at 900–1000° F., such as is encountered in the lift pipe 28. For example, approximately 50 per cent breakage is encountered at 2.5–3.0 per cent moisture and substantially complete breakage of the fresh catalyst occurs when the moisture content is about 5 to 6 per cent. It has been discovered, however, that catalyst containing as much as 5 per cent water can be heated in an air stream at 300–350° F. with little breakage; the breakage increases rapidly with temperature. However, if the catalyst is heated to about 300–350° F. and purged for a suitable period of time with a dry gas, so that the moisture content by weight of the catalyst is reduced to about 1 per cent or less, it can then be subjected to a 1000° F. air stream without breakage. It was considered that this difficulty could be overcome by introducing the cold moist catalyst with a large body of hot catalyst, as when make-up catalyst is added to a stream of hot circulating catalyst. But it has been found that the breakage of catalyst containing more than about 1.5 per cent moisture when introduced into the system by this procedure is excessive. This breakage is somewhat less than that encountered by heating in a hot air stream, being about 20 per cent as compared to 50 per cent for catalyst containing 2.5 to 3 per cent water by weight, but this value is still prohibitive for commercial purposes.

In a preferred form of this invention, a stream of hot catalyst is taken from the conduit 31 through conduit 70 to a slide valve chamber 71. The catalyst stream is then passed downwardly through the vertical conduit 72 to mix with the fresh catalyst discharged from the elevator 41. By properly proportioning the streams of hot and cold catalyst, the mixture of catalyst is introduced into the residence and overflow box 43 at about 350° F. or thereabouts. A dry gas, such as air, is introduced into the box 43 via the conduit 73 to pass upwardly through the solids in the box and be discharged through the vent pipe 74. A slide valve 75 located in the conduit 44, is adjusted to retain the catalyst in the residence box 43 for the necessary residence time.

Referring now to Figure 4, a vertical sectional view of the residence and overflow box, the mixture of hot and cold catalyst is introduced into the top of the box through the conduit 42. A horizontal plate 76 is located intermediate the top and bottom of the box 43. Depending conduits 77 are attached to the plate and communicate the upper chamber 78 with the lower chamber 79.

The dry gas is introduced through the conduit 73 into the protected region beneath the plate 76. The gas passes upwardly through the conduits 77 and the bed of solids above the plate 76. The purge gas drives the moisture, removed from the wet catalyst by contact with the hot dry catalyst, from the chamber 78 via the vent conduit 74 in the top of the overflow box 43. The horizontal cross-section of the main portion of the overflow box is circular, as shown on Figure 5. A rectangular end chamber 82 is attached to or apart of the box 43, or at least the upper portion thereof. This chamber is in communication with the chamber 78, being separated by a weir wall 83. When the solids in the chamber 78 build up to the level of the weir wall 83, the particles overflow into the chamber 82 and are conducted through the conduit 84 into the catalyst storage hopper 51.

Referring now to Figure 3, the interior of the slide valve 71 is shown. The valve plate 90 is adapted to slide horizontally at an intermediate level in the valve. The conduit 70 is terminated at one end of the top of the valve body and the conduit 72 is attached to the bottom of the valve body at the other end thereof. A hole 91 is located in the valve plate 90. This hole can be located over the outlet conduit 72 or beneath the inlet conduit 70 or at some intermediate location by sliding the valve plate 90 into the desired position. The conduit 70 communicates with the interior of the valve 71 via an orifice 92 located in the top of the valve 71. This orifice is made smaller than the interior cross-section of the conduit 70, so that the ratio of hot catalyst to cold catalyst cannot be greater than a predetermined maximum, which corresponds to the maximum mixture temperature desired. The aperture 91 in the valve plate 90 is made larger than the aperture 92 so that there is no substantial restriction in the flow of solids through the valve plate when the valve is opened. The catalyst drops onto the valve plate 90 forming a pile of solids with a surface at the angle of repose of the catalyst with the horizontal. When the plate 90 is slid so that the aperture 91 is at the opposite end of the valve body from the aperture 92 the solids pile up on the plate and flow is interrupted. As the valve plate is moved to bring the aperture 91 closer to the aperture 92, flow through the aperture 91 commences. It is seen that any desired flow of solids from maximum, determined by the size of the orifice 92, to zero may be provided by locating the valve plate 90 in the appropriate location.

Figure 5 is a horizontal cross-section of the residence and overflow box 43. This view shows the weir wall 83, the end chamber 82 and the over-flow pipe 84.

The invention may be illustrated by reference to Table I developed from experimental tests. Hot dry catalyst and cold wet catalyst were mixed and purged with dry air. The purged catalyst was then shock tested in a hot air stream simulating conditions of a moving bed catalyst air lift. The following results were obtained:

TABLE I

Summary of test data for the drying of bead catalyst

| Run No | 1 | 2 | 3 | 4 | 5 | 6 | 7 | 8 |
|---|---|---|---|---|---|---|---|---|
| Conditions: | | | | | | | | |
| Catalyst Residence Time, Min | 7 | 4 | 2 | 3 | 1 | 5 | 1 | 5 |
| Superficial Air Velocity, Ft./Sec. (60° F. Atmospheric Pressure) | 0.22 | 0.22 | 0.22 | 0.22 | 0.11 | 0.11 | 0.60 | 0.62 |
| Average Indicated Bed Temperature, °F | 328 | 382 | 412 | 400 | 347 | 392 | 353 | 374 |
| Weight Ratio, Hot/Cold Catalyst | 1:2 | 1:2 | 1:2 | 1:2 | 1:1.8 | 1:1.8 | 1:1.8 | 1:1.8 |
| Results: | | | | | | | | |
| Moisture in Dried Catalyst, percent Wt.[1] | 0.9 | 1.1 | 1.5 | 1.1 | 1.20 | 0.92 | 1.15 | 0.46 |
| Breakage, Percent Wt.: [2] | | | | | | | | |
| Whole Beads | 100.0 | 100.0 | 69.4 | 94.0 | | | | |
| Broken Beads | 0.0 | 0.0 | 30.6 | 6.0 | | | | |

[1] Initial moisture content of beads=4.87 percent wt. (dry basis).
[2] Breakage test conditions: Gas stream 100 ft./sec. vel. at atmospheric pressure and flowing temperature of 970° F.

Figure 7:
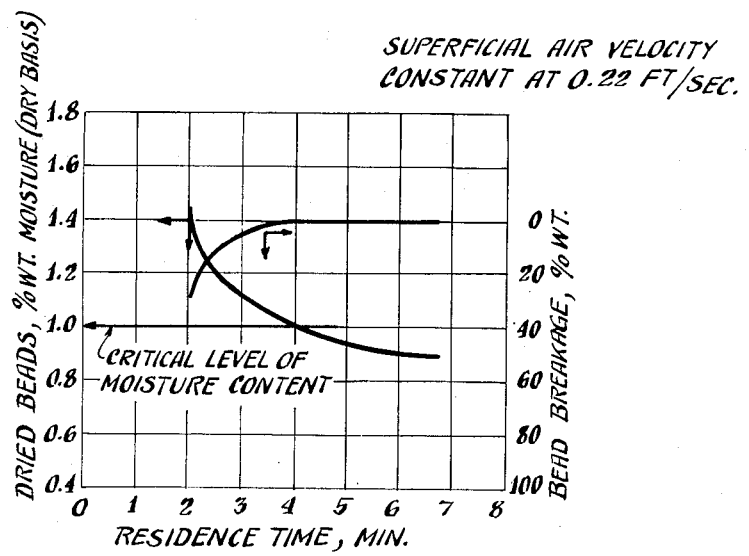
Figure 7 is a graph showing the effect of catalyst residence time upon drying efficiency.

The results of Table I are shown graphically on Figures 6 and 7. The critical minimum residence time is seen from Figure 7 to be about 4 minutes. These results indicate that the broad and preferred commercial operating ranges should be as follows:

| Condition | Broad Range | Preferred Range |
|---|---|---|
| Observed Mix Temperature, °F | 300–500 | 350–400 |
| Residence Time, Min | 1–30 | 3.5–7 |
| Superficial Air Velocity, Ft./Sec. (60° F. and one atmosphere) | 0.1–0.6 | 0.2–0.3 |

The ratio of the flow rates of the hot and cold catalyst are adjusted to give the proper mixture temperature in the residence box and the flow of solids from the residence box is adjusted to provide the proper residence time. The valve plate 95 in the slide valve 75 has a series of orifices of graded size so that the desired residence time may be effected by suitable adjustment of the valve.

As a second illustration of the invention, apparatus similar to that described hereinabove and shown on Figures 1, 2, 3, 4, and 5 was incorporated in a commercial moving bed conversion system, similar to that shown on Figure 1. A summary of the results obtained is shown in Table II.

TABLE II

*Drying of make-up catalyst for a TCC unit*

Conditions:

| | |
|---|---|
| Catalyst residence time, min | 3.5 |
| Average temp., °F | 375 |
| Superficial air vel., ft./sec. (60° F. and atmospheric pressure) | 0.20 |

Flow rates, lb./hr.—

| | |
|---|---|
| Fresh catalyst (cold) | 1750 |
| Regenerated catalyst (hot) | 2040 |
| Total | 3790 |
| Ratio of hot cold | 1.17 |

Moisture content, per cent wt.:

| | |
|---|---|
| Fresh catalyst | 2.32 |
| Regenerated catalyst | 0.31 |

Results:

| | |
|---|---|
| Dried product, per cent wt. moisture | 0.76 |

Inspection of the test results indicate that:

(1) The moisture content of the dried catalyst (0.76 per cent by weight) was considerably below the critical value (1 per cent, by weight), (2) This result was obtained by operating the unit in the preferred range of operating conditions.

The examples and illustrations, given hereinabove, were supplied to illustrate the invention, and not to limit its scope. It is intended that the scope of this invention be considered broadly to cover all changes and modifications of the examples of the invention herein chosen for purposes of disclosure, which do not constitute departures from the spirit of the invention.

We claim:

1. In a hydrocarbon conversion process wherein a granular contact material is passed cyclically as a moving bed through an enclosed path which includes two contact zones, one being a reaction zone wherein it flows downwardly as a substantially compact column while contacting a fluid hydrocarbon charge to effect conversion of said charge to gasiform product, the other zone being a reconditioning zone wherein the contact material flows downwardly as a substantially compact column while being contacted with a suitable gas to effect its reconditioning for reuse in said conversion zone, the improvement that comprises withdrawing a stream of hot contact material from the cyclic path at a temperature within the range of about 700° to 1300° F. intermixing the withdrawn hot contact material in direct heat exchange relationship with a stream of fresh moisture containing make-up contact material in sufficient amount to bring the temperature of the make-up contact material and the withdrawn hot contact material to an equilibrium temperature within the range of about 300° to 500° F., blowing off the moisture driven from the make-up contact material with a dry gas for a period of at least one minute at a gas temperature which will not alter the equilibrium temperature of the intermixed hot contact material and make-up contact material beyond said temperature range and then adding the mixture to the main stream of contact material in the cyclic path.

2. In a hydrocarbon conversion process wherein a granular contact material is passed cyclically as a moving bed through an enclosed path which includes two contact zones, one being a reaction zone wherein it flows downwardly as a substantially compact column while contacting a fluid hydrocarbon charge to effect conversion of said charge to gasiform product, the other zone being a reconditioning zone wherein the contact material flows downwardly as a substantially compact column while being contacted with a suitable gas to effect its reconditioning for reuse in said conversion zone, the improvement that comprises withdrawing a stream of hot contact material from the cyclic path at a temperature within the range of about 700° to 1300° F. intermixing the withdrawn hot contact material in direct heat exchange relationship with a stream of fresh moisture containing make-up contact material in sufficient amount to bring the temperature of the make-up contact material and the withdrawn hot contact material to an equilibrium temperature within the range of about 350° to 400° F., blowing off the moisture driven from the make-up contact material with a dry gas for a period of at least one minute at a gas temperature which will not alter the equilibrium temperature of the intermixed hot contact material and make-up contact material beyond said temperature range and then adding the mixture to the main stream of contact material in the cyclic path.

3. In a moving bed conversion system in which conduit means connects the bottom of one of the contacting vessels with a lift tank located therebelow, a lift pipe connects the lift tank with a separator located above the other contacting vessel, and conduit means connects the bottom of the separator with the top of the second contacting vessel, the improvement which comprises: conduit means for withdrawing granular contact material from the bottom of the separator, a first downwardly directed conduit attached to said means, a combining box attached to the bottom of the first conduit, a second downwardly directed conduit attached to said means, valve means in said second conduit for controlling the flow rate of solids through said conduit, a residence and overflow box, a third downwardly directed conduit connected at its lower end to the top of said residence and overflow box, the bottom of the second conduit being attached to the third conduit, a vertical weir wall in said residence and overflow box, dividing said box into an overflow chamber and residence chamber, the third conduit being terminated above the residence chamber, conduit means for withdrawing contact material from said overflow chamber, gas introduction means in the lower portion of said residence and overflow box, gas withdrawal means in the upper portion of said residence and overflow box, a fourth conduit attached to the bottom of said residence and overflow box in communication with said residence chamber, said fourth conduit being downwardly directed and attached at its lower end to said combining box, valve means in said fourth conduit for controlling the residence time of solids in the residence chamber of said residence and overflow box, and a discharge conduit connecting the bottom of the combining box and the lift tank, the length of the withdrawal conduit being sufficient to provide a substantially compacted seal leg of contact material, whereby the escape of lift gas from the lift tank through the conduit is prevented.

References Cited in the file of this patent

UNITED STATES PATENTS

| 377,292 | Dable | Jan. 31, 1888 |
| 2,432,822 | Secor | Dec. 16, 1947 |
| 2,704,740 | Oblad et al. | Mar. 22, 1955 |

OTHER REFERENCES

"New Houdriflow Installations," Petroleum Refiner, September 1950, vol. 29, No. 9, pages 170, 171 and 175.